(12) United States Patent
Fraser et al.

(10) Patent No.: US 9,778,091 B2
(45) Date of Patent: Oct. 3, 2017

(54) SYSTEMS AND METHODS FOR ANALYZING FLUID FROM A SEPARATOR

(71) Applicant: Schlumberger Technology Corporation, Sugar land, TX (US)

(72) Inventors: Laurence Fraser, Houston, TX (US); Mathilde Jan, Clamart (FR); Gary Martin Oddie, St. Neots (GB); Francis Allouche, Le Plessis Robinson (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 181 days.

(21) Appl. No.: 14/500,873

(22) Filed: Sep. 29, 2014

(65) Prior Publication Data

US 2016/0091358 A1    Mar. 31, 2016

(51) Int. Cl.
G01F 1/84      (2006.01)
G01F 15/08     (2006.01)
B01D 49/00     (2006.01)
G01F 25/00     (2006.01)
G01F 1/74      (2006.01)

(52) U.S. Cl.
CPC ............ *G01F 25/0053* (2013.01); *G01F 1/74* (2013.01); *G01F 1/8436* (2013.01); *G01F 15/08* (2013.01); *G01F 25/0007* (2013.01)

(58) Field of Classification Search
CPC ..... G01F 1/84; G01F 1/00; G01F 1/74; G01F 1/8436; G01F 15/08; G01F 25/00; G01F 25/0007; G01F 25/0053; B01D 49/00
See application file for complete search history.

(56) References Cited

U.S. PATENT DOCUMENTS

| | | | |
|---|---|---|---|
| 4,539,023 | A | 9/1985 | Boley |
| 5,029,482 | A | 7/1991 | Liu et al. |
| 5,497,665 | A | 3/1996 | Cage et al. |
| 5,526,684 | A | 6/1996 | Liu et al. |
| 5,687,100 | A | 11/1997 | Buttler et al. |

(Continued)

FOREIGN PATENT DOCUMENTS

| | | |
|---|---|---|
| CA | 2559701 A1 | 10/2005 |
| EP | 1646849 A2 | 4/2006 |

(Continued)

OTHER PUBLICATIONS

Combined Search and Examination Report under Section 17 and 18(3) mailed Feb. 17, 2016 in the corresponding GB application 1515488.3 (pp. 8).

(Continued)

*Primary Examiner* — Nguyen Ha
(74) *Attorney, Agent, or Firm* — Cameron R. Sneddon

(57) ABSTRACT

A method for analyzing the reliability of a measured volumetric flow rate of a fluid in a gas outlet line of a gas-liquid separator is provided. In one embodiment, analyzing the reliability of the measured volumetric flow rate includes measuring a gas volume fraction of the fluid in the gas outlet line, comparing the measured gas volume fraction of the fluid to a threshold gas volume fraction level, and determining whether the measured volumetric flow rate of the fluid is reliable based on the comparison. Additional systems, devices, and methods are also disclosed.

20 Claims, 4 Drawing Sheets

(56) References Cited

U.S. PATENT DOCUMENTS

| | | |
|---|---|---|
| 6,318,156 B1 | 11/2001 | Dutton et al. |
| 6,327,915 B1 | 12/2001 | Van Cleve et al. |
| 6,732,570 B2 | 5/2004 | Francisco, Jr. |
| 6,857,315 B1 | 2/2005 | Mills et al. |
| 7,523,639 B2 | 4/2009 | Hays |
| 7,661,302 B2 * | 2/2010 | Gysling ............ G01F 1/36 73/200 |
| 7,871,526 B2 | 1/2011 | Allouche |
| 8,641,813 B2 | 2/2014 | Gysling |
| 2002/0123852 A1 * | 9/2002 | Gysling ............ G01F 1/74 702/100 |
| 2006/0096388 A1 | 5/2006 | Gysling et al. |
| 2007/0271070 A1 | 11/2007 | Dmytriw et al. |
| 2008/0028822 A1 | 2/2008 | Mattar |
| 2008/0053240 A1 | 3/2008 | Henry et al. |
| 2008/0190195 A1 | 8/2008 | Duffill et al. |
| 2010/0299089 A1 | 11/2010 | Stack et al. |
| 2014/0076035 A1 | 3/2014 | Henry |
| 2014/0090484 A1 | 4/2014 | Henry et al. |
| 2014/0182368 A1 | 7/2014 | Fraser et al. |
| 2014/0224006 A1 * | 8/2014 | Scott ............ E21B 49/00 73/152.18 |
| 2014/0251026 A1 | 9/2014 | Oddie |

FOREIGN PATENT DOCUMENTS

| | | |
|---|---|---|
| WO | WO9510028 A1 | 4/1995 |
| WO | WO9605484 A1 | 2/1996 |
| WO | WO9831990 A1 | 7/1998 |
| WO | WO0131298 A2 | 5/2001 |

OTHER PUBLICATIONS

Extended Search Report issued in the related EP Application 12306711.8, dated Jun. 18, 2013 (6 pages).

Communication pursuant to Article 94-3 issued in the related EP Application 12306711.8, dated Sep. 29, 2016 (5 pages).

Roger.C. Baker, "Flow measurement handbook: Industrial Designs, Operating Principles, Performance and Applications—Coriolis Flowmeters," Chapter 17, Cambridge University Press, 2000, pp. 398-426.

G.M. Oddie and J.R.A. Pearson, "Flow rate measurement in two phase flow," Annual Review of Fluid Mechanics vol. 36, pp. 149-172.

"Mass flow meter," from Wikipedia at http://en.wikipedia.org/wiki/Mass_flow_meter.

Extended Search Report issued in the related EP Application 14000783.2, dated May 28, 2014 (9 pages).

Extended Search Report issued in the related EP Application 12306712.6, dated Aug. 21, 2013 (7 pages).

* cited by examiner

SYSTEMS AND METHODS FOR ANALYZING FLUID FROM A SEPARATOR

BACKGROUND

Wells are generally drilled into subsurface rocks to access fluids, such as hydrocarbons, stored in subterranean formations. The subterranean fluids can be produced from these wells through known techniques. Operators may want to know certain characteristics of produced fluids to facilitate efficient and economic exploration and production. For example, operators may want to know flow rates of produced fluids. These produced fluids are often multiphase fluids (e.g., those having some combination of water, oil, and gas), making measurement of the flow rates more complex.

Various systems can be used to determine flow rates for multiphase fluids. In some systems, multiphase fluids are separated into their constituent phases and these phases are then individually tested to determine flow rates. Separators use gravity to separate gas and liquid components of a multiphase fluid within a separation vessel. Two-phase separators can be used to separate gas from liquid components of the multiphase fluid, and three-phase separators can be used to separate gas, water, and oil. Diffusers, demisters, and other devices can be used within the separation vessel to facilitate separation. The separated fluids can be routed from the separation vessel via outlet lines. Parameters, such as volumetric flow rate, of the separated fluids flowing through the outlet lines can then be determined.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In one embodiment of the present disclosure, a method includes measuring volumetric flow rate of a fluid in a gas outlet line of a gas-liquid separator and analyzing reliability of the measured volumetric flow rate of the fluid. Analyzing reliability of the measured volumetric flow rate of the fluid can include measuring a gas volume fraction of the fluid in the gas outlet line of the gas-liquid separator with a sensor. The analysis can also include comparing the measured gas volume fraction to a threshold gas volume fraction level and determining whether the measured volumetric flow rate of the fluid is reliable based on the comparison.

In another embodiment of the present disclosure, an apparatus includes a separator having a gas-liquid separation vessel, a gas outlet line coupled to receive a gas-containing fluid from the gas-liquid separation vessel, and a Coriolis meter coupled to the gas outlet line to enable measurement of mass flow rate of the gas-containing fluid. The apparatus also includes an analysis system that can calculate a volumetric flow rate of the gas-containing fluid using the measured mass flow rate, as well as a gas volume fraction of the gas-containing fluid. The analysis system can also use the gas volume fraction to verify accuracy of the calculated volumetric flow rate.

In an additional embodiment, a method includes routing a multiphase fluid into a separator and separating the multiphase fluid into a first fluid and a second fluid. The first fluid can be routed from the separator into a gas outlet line and a gas volume fraction of the first fluid within the gas outlet line can be determined. The method also includes measuring a flow rate of the first fluid within the gas outlet line and using the determined gas volume fraction to assess quality of the flow rate measurement.

Various refinements of the features noted above may exist in relation to various aspects of the present embodiments. Further features may also be incorporated in these various aspects as well. These refinements and additional features may exist individually or in any combination. For instance, various features discussed below in relation to the illustrated embodiments may be incorporated into any of the above-described aspects of the present disclosure alone or in any combination. Again, the brief summary presented above is intended just to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION

It is to be understood that the present disclosure provides many different embodiments, or examples, for implementing different features of various embodiments. Specific examples of components and arrangements are described below for purposes of explanation and to simplify the present disclosure. These are, of course, merely examples and are not intended to be limiting.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not mandate any particular orientation of the components.

Embodiments of the present disclosure generally relate to the analysis of fluid output from a separator. More particularly, in at least some embodiments, a fluid analysis apparatus is used to measure a volumetric flow rate of a fluid output from a separator and to determine the reliability of the measured volumetric flow rate. In some instances, a gas volume fraction can be determined (e.g., using a Coriolis meter) and used to assure reliability of the measured volumetric flow rate. If the determined gas volume fraction indicates that the volumetric flow rate is not reliable, an operator can be notified and separator settings can be adjusted to increase reliability.

Figure 1:
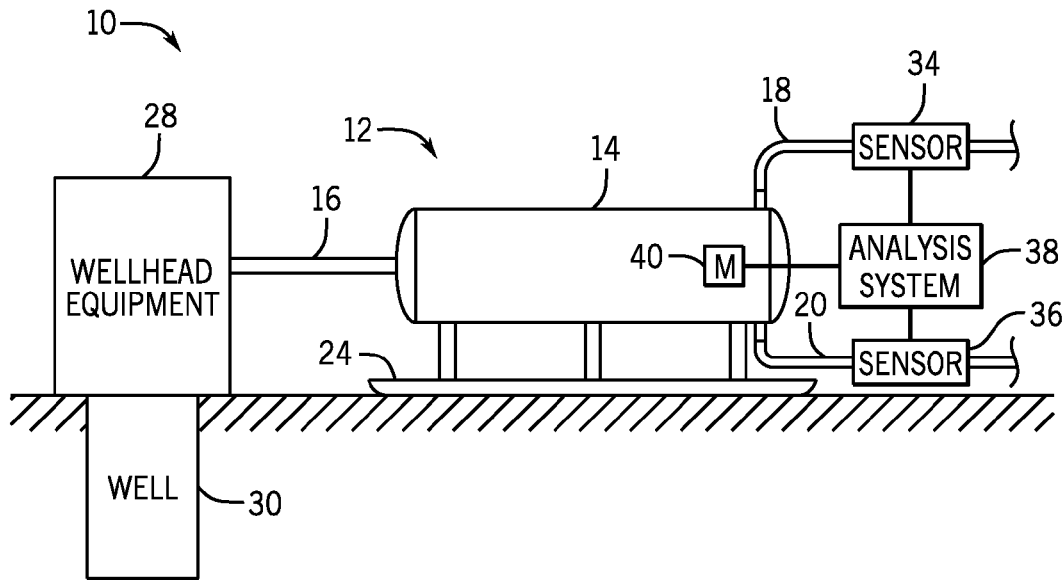
FIG. 1 generally depicts an apparatus including a separator provided at a wellsite in accordance with one embodiment of the present disclosure.

Turning now to the drawings, an apparatus 10 for separating multiphase fluid and measuring flow rates of separated fluids is generally depicted in FIG. 1 in accordance with one embodiment. While certain elements of the apparatus 10 are depicted in this figure and generally discussed below, it will be appreciated that the apparatus 10 may include other components in addition to, or in place of, those presently illustrated and discussed. Moreover, although the apparatus 10 may be used at a wellsite to separate multiphase fluid produced from a well, the apparatus 10 could be used away from a wellsite. Further, the apparatus 10 could be used to separate other multiphase fluids and is not limited to hydrocarbon-bearing fluids or to oilfield contexts.

As depicted, the apparatus 10 includes a separator 12 having a separation tank or vessel 14. The separator 12 is depicted here as a horizontal separator, but a vertical separator 12 could be used in other embodiments. Multiphase fluid can be directed into the vessel 14 through the inlet line 16 for separation. In some instances, the separator 12 is a gas-liquid separator constructed to separate gas from liquid within a gas-liquid separation vessel 14. The separation vessel 14 can include any of various mechanisms that facilitate separation of components of the incoming fluid, such as diffusers, mist extractors, vanes, baffles, and precipitators to name several examples.

The separator 12 uses gravity to separate gas and liquid components of the multiphase fluid within the vessel 14. The separator 12 can be a two-phase separator or a three-phase separator. Gas separated from the multiphase fluid can be routed away from the vessel 14 through a gas outlet line 18, while the remaining fluid can be routed away from the vessel 14 through one or more liquid outlet lines 20. Although a single liquid outlet line 20 is depicted in FIG. 1, it is noted that a three-phase separator 12 could have separate oil and water outlet lines 20.

The separation vessel 14 can be mounted on a skid 24 to facilitate transport and handling of the separator 12, allowing the separator 12 to be more easily deployed at different locations. In the presently depicted embodiment, the separator 12 is deployed at a wellsite and is coupled to wellhead equipment 28 installed at a well 30. The wellhead equipment 28 could include casing and tubing heads, a production tree, a blowout preventer, a choke, and a heat exchanger, to name but a few examples. Fluid produced from the well 30 can be routed through the wellhead equipment 28 and the inlet line 16 into the separation vessel 14. The produced fluid can be separated within the vessel 14 and routed into the outlet lines, as generally described above.

Various sensors 34 and 36 can be used with an analysis system 38 (e.g., a programmed computer system) to determine parameters of the fluids passing through the outlet lines 18 and 20. For example, in some embodiments, the sensors 34 and 36 are provided in the form of Coriolis flow meters. The Coriolis flow meters can be installed in the gas and liquid outlet lines 18 and 20 so that the fluids in these lines flow through the Coriolis flow meters. As described further below, this arrangement facilitates measurement of density and mass flow rates for these fluids. Data collected by the sensors 34 and 36 (e.g., from Coriolis flow meters), and from other sensors in some embodiments, can be processed by the analysis system 38 to determine one or more fluid parameters, such as mass flow rate, density, and volumetric flow rate. The analysis system 38 can be located at a wellsite with the separator 12, but the analysis system 38 could be provided remote from a wellsite in some embodiments. The analysis system 38 could also be provided as a distributed system in which some components are provided at a wellsite and others are not.

Although the fluid output from the vessel 14 through the gas outlet line 18 may be mostly gas, it will be appreciated that the separated gas in the outlet line 18 can be a wet gas that includes a liquid component. Likewise, liquids routed out of the vessel 14 through the liquid outlet lines 20 could include some entrained gas. In at least some embodiments, the gas volume fraction of the fluid within the gas outlet line 18 is used for quality control of the separation process and for quality assurance to verify reliability of other fluid parameters (e.g., flow rate). The gas volume fraction of the fluid within the gas outlet line 18 can be determined in any suitable manner. For instance, in one embodiment, the separator 12 includes a carry-over meter 40 that can be used to measure the liquid carry-over in the gas separated in the vessel 14 and routed out through the gas outlet line 18, which can be used to determine the gas volume fraction of the separated gas. Examples of such a carry-over meter are described in U.S. Patent Application Publication No. 2014/0182368, which published on Jul. 3, 2014. In another embodiment, the gas volume fraction is determined through use of an inefficiency factor technique, which is described below and also in additional detail in U.S. patent application Ser. No. 14/197,585, filed Mar. 5, 2014, and entitled "Coriolis Flow Meter."

Figure 2:
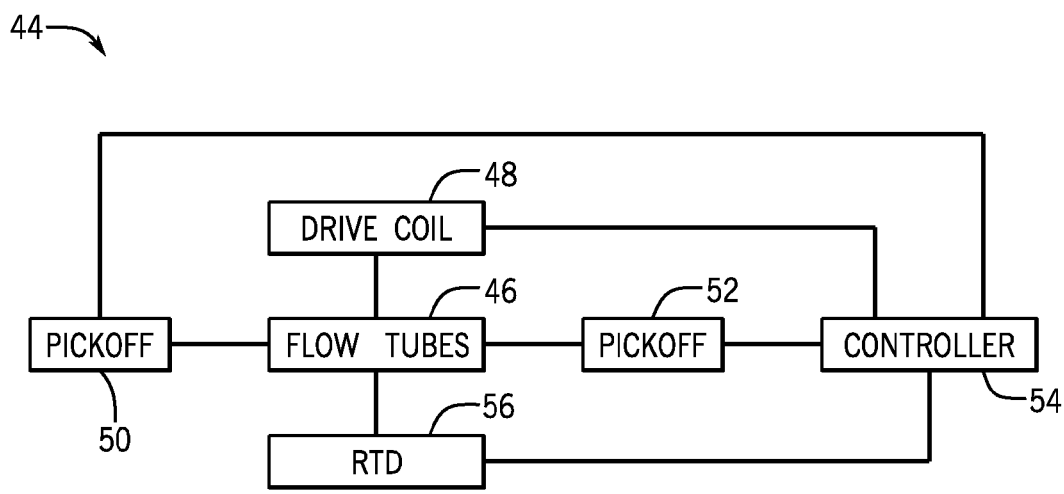
FIG. 2 is a block diagram of components of a Coriolis flow meter that could be used as part of the apparatus in FIG. 1 in accordance with one embodiment.

As noted above, the sensors 34 and 36 can be provided in the form of Coriolis flow meters that allow measurement of mass flow rate and density of fluids in the separator outlet lines 18 and 20. By way of example, certain components of a Coriolis flow meter 44 that can be used to measure such parameters in the outlet lines 18 and 20 are generally depicted in FIG. 2, though it will be appreciated that the Coriolis meter 44 could be provided in other forms as well. As depicted, the Coriolis meter 44 includes one or more flow tubes 46 designed to receive a flowing fluid. In one embodiment, the Coriolis meter 44 includes a pair of parallel, curved flow tubes 46. The Coriolis meter 44 can be coupled in fluid communication with a separator outlet line, such as gas outlet line 18, so that the separated fluid in the outlet line is routed through the curved flow tubes 46.

The meter 44 also includes a drive coil 48 and pickoffs 50 and 52. The drive coil 48 can be driven by electrical control signals (e.g., from a controller 54) and interacts with a complementary magnet to cause the flow tubes 46 to vibrate (e.g., to oscillate at their natural frequency). The pickoffs 50 and 52 include sensing coils and magnets that enable measurement of the vibration of the flow tubes 46.

As will be appreciated, fluid flowing through curved flow tubes 46 of Coriolis meter 44 generally resists the vibration of the flow tubes 46 and causes the tubes 46 to twist. While the flow tubes 46 continue to vibrate, the twisting caused by the fluid flow results in a phase difference in the oscillation of the inlet and outlet sides of the tubes 46. The pickoffs 50 and 52 can be provided on opposing sides of the tubes 46 to measure this phase difference. For instance, the pickoff 50 can be provided at the inlet sides of the tubes 46 and the pickoff 52 can be provided at the outlet side of the tubes 46.

The magnet and sensing coil of each pickoff 50 and 52 move with respect to one another due to the oscillation of the flow tubes 46. Because of this relative motion, the magnetic field of each pickoff magnet induces in its corresponding sensing coil an electrical current that can be used to determine the oscillation frequency and the phase difference between the pickoffs 50 and 52. The phase difference and the oscillation frequency can then be used to determine the mass flow rate and the density of the fluid flowing through the tubes 46. The meter 44 also includes a resistance temperature detector 56, which can be used to measure the temperature of the flowing fluid and to enable compensation for the effects of temperature on the meter 44 (e.g., by changing flow tube stiffness) in the calculations of mass flow rate and density. The controller 54 can calculate the mass flow rate and the density based on measurement signals received from the pickoffs 50 and 52 and the resistance temperature detector 56. It is further noted that, in certain embodiments, the analysis system 38 could be provided as the controller 54 or the controller 54 could be provided as part of the analysis system 38.

Figure 3:
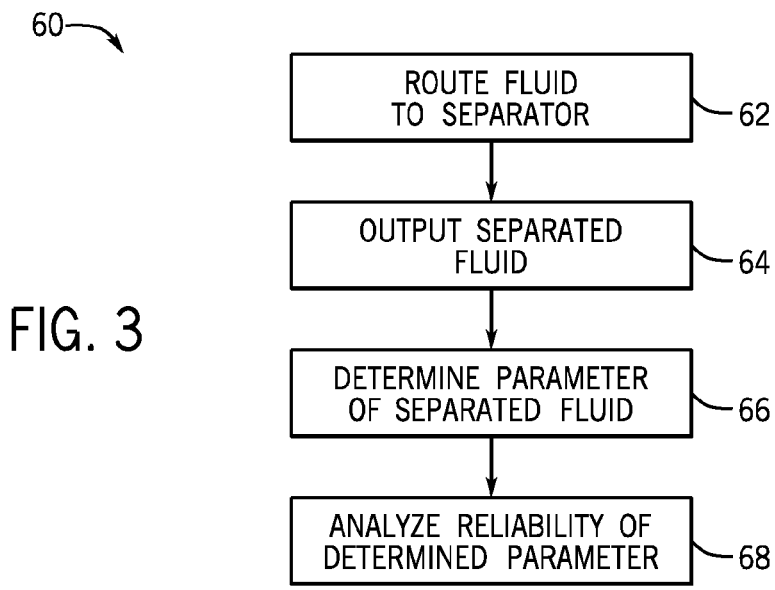
FIG. 3 is a flow chart for determining a parameter of a fluid output from a separator and analyzing the reliability of the determined parameter in accordance with one embodiment.

With the foregoing in mind, an example of a process for determining a fluid parameter and analyzing its reliability is generally represented by flow chart 60 in FIG. 3. In this embodiment, fluid is routed to a separator (block 62). For example, as described above, a multiphase fluid produced from a well can be routed to the separator 12 for separation of gas and liquids from the multiphase fluid. The separated fluids can be output from the separator (block 64), such as by routing separated gas through the outlet line 18 and separated liquids through the one or more outlet lines 20. Sensors at the outlet lines 18 or 20 can be used to determine a parameter of a separated fluid (block 66) and the reliability of the determined parameter can be analyzed (block 68) for quality control, quality assurance, or another desired purpose. For instance, in some embodiments sensors are used to determine a component volume fraction (e.g., gas volume fraction or liquid volume fraction) of the separated fluid, which can then be used to verify the accuracy of another determined parameter, such as the flow rate of the separated fluid.

Figure 4:
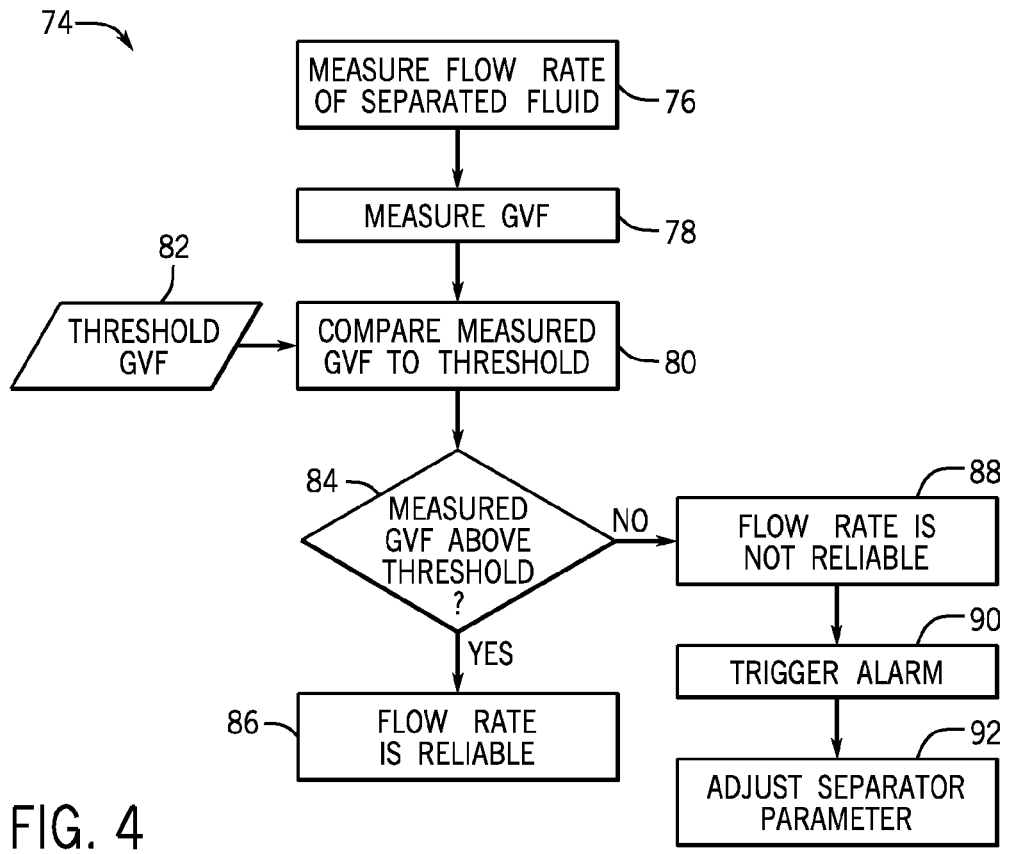
FIG. 4 is a flow chart for using a gas volume fraction of a fluid output from a separator to determine whether a determined flow rate of the fluid is reliable in accordance with one embodiment.

An example of such a process for using a gas volume fraction measurement to verify accuracy of a measured flow rate of a separated fluid is generally represented by flow chart 74 in FIG. 4, though a different component volume fraction measurement (e.g., of the liquid volume fraction) could also or instead be used for such verification. In this embodiment represented by flow chart 74, the flow rate of a separated fluid (e.g., fluid flowing from the separation vessel 14 through the gas outlet line 18) and its gas volume fraction (GVF) are measured (blocks 76 and 78). The gas volume fraction and the flow rate of the separated fluid can be measured using a Coriolis meter or in any other suitable manner. In some instances, the gas volume fraction of a separated fluid can be measured first and then used in calculating the volumetric flow rate of the separated fluid.

The reliability of the measured volumetric flow rate can be determined by comparing (block 80) the measured gas volume fraction to a threshold gas volume fraction level 82. More specifically, as represented by decision block 84 in FIG. 4, if the measured gas volume fraction is above the threshold 82, the measured flow rate is deemed (block 86) to be reliable. If the measured gas volume fraction is below the threshold 82, however, the measured flow rate is deemed (block 88) to not be sufficiently reliable. The threshold gas volume fraction 82 can be selected in any suitable way. For instance, the threshold gas volume fraction 82 could be selected based on a desired level of accuracy for a measured parameter (e.g., the volumetric flow rate). In one embodiment, the threshold is determined based on a desired level of accuracy of a volumetric flow rate measurement for the separated fluid in the gas outlet line 18, as well as on a margin of error in the measurement of the gas volume fraction of the separated fluid and a margin of error in the calculation of the volumetric flow rate of the fluid using the measured gas volume fraction. The desired level of accuracy can vary in different applications for the separator 12. In some instances an accuracy of 90% (i.e., a 10% margin of error) may be sufficient, while in other cases a greater accuracy (e.g., 95% or 98%) may be desired.

In response to determining that the measured flow rate is not sufficiently reliable (that is, that the measured gas volume fraction is below the threshold level), the analysis system 38 can trigger an alarm (block 90), such as by outputting a notification to an operator (e.g., a visual or audible signal indicative of insufficient reliability in the measured data). In other instances, flow rate measurements that are deemed to be insufficiently reliable can be flagged for later consideration. Further, in some instances the analysis system 38 can automatically adjust (block 92) one or more parameters of the separator 12 (e.g., by adjusting a control setting for temperature, pressure, or liquid level in the separation vessel 14) to increase separation efficiency and lower the amount of liquid carry-over in the gas outlet 18 in response to determining that the flow rate is not sufficiently reliable.

By way of further example, in some embodiments the efficiency of a separator 12 can be determined in real-time and used for quality control and quality assurance of other measurements (e.g., flow rate of separated fluid). The liquid carry-over in a gas outlet line 18 of a separator 12 can be used as a way to quantify separation efficiency. One way of characterizing the liquid carry-over is to give the gas volume fraction of the separated gas, which may be defined as:

$$\text{Gas Volume Fraction} = \frac{Q_g(\text{m}^3/\text{s})}{Q_l(\text{m}^3/\text{s}) + Q_g(\text{m}^3/\text{s})}$$

where $Q_l$ and $Q_g$ are the liquid and gas volumetric flow rates in the gas outlet line 18 of a separator 12 at line conditions.

As noted above, the gas volume fraction of the fluid in the gas outlet line 18 can be determined using a Coriolis meter. In using a Coriolis meter to determine fluid parameters, it has been found that the liquid volume fraction (LVF) of a wet gas (which can be defined as LVF=1−GVF) is a function of an inefficiency factor l that can be defined as:

$$l = Coeff \cdot \frac{DG}{POV^2}$$

where DG is the drive gain of the Coriolis meter, POV is a pickoff voltage amplitude of the Coriolis meter, and "Coeff." is a constant that is meter dependent. The drive gain DG can represent the percentage of drive being applied to a drive coil (e.g., drive coil 48) to keep the tubes (e.g., flow tubes 46) vibrating at their resonance frequency with maximal amplitude, with 0% meaning no drive and 100% meaning full drive. In single-phase flow, the drive gain should not exceed 10%. The pickoff voltage amplitude POV can be the peak-to-peak voltage amplitude of a pickoff sensing coil (e.g., of pickoff 50 or 52). In one embodiment in which the pickoff voltage amplitude POV is measured in mV, "Coeff." is equal to 0.001. But "Coeff." can vary based on the physical characteristics of the Coriolis meters used, such as the geometry, the resonance frequency of the flow tubes, and the size of the drive coils, and can be determined empirically for different Coriolis meters.

The inefficiency factor is proportional to the LVF, which allows the GVF to be estimated from the drive gain DG and the pickoff voltage amplitude POV (that is, from the inefficiency factor) according to:

$$GVF = 1 - (I - I_0)$$

where $$I_0 = Coeff \cdot \frac{DG_0}{POV_0^2},$$

$DG_0$ is the drive gain at 100% GVF (when there is no liquid), and $POV_0$ is the pickoff voltage amplitude at 100% GVF. Introducing the $I_0$ factor helps ensure that in the case of dry gas, the calculation of GVF will equal 100% (likewise, LVF will equal 0%). In at least some embodiments, the accuracy of the GVF (or LVF) determination based on the inefficiency factor can be measured for subsequent use in determining reliability of other fluid parameters (e.g., the volumetric flow rate of gas in the gas outlet line 18). For example, in one embodiment, empirical data can be analyzed to determine that the GVF derived from the inefficiency factor has a 1% margin of error when the GVF is at least 98%.

Being able to measure the GVF on the gas line of the separator facilitates a systematic quality control check. Monitoring the GVF facilitates operator-adjustment of the pressure, the temperature, or the liquid level settings of the separator to reduce liquid carry-over. In other instances, the drive gain of a Coriolis meter could be monitored to facilitate operator reaction to adjust separator settings. Further, in some instances an analysis system 38 can automatically adjust the separator settings in real-time based on the monitored GVF or drive gain.

Figure 5:
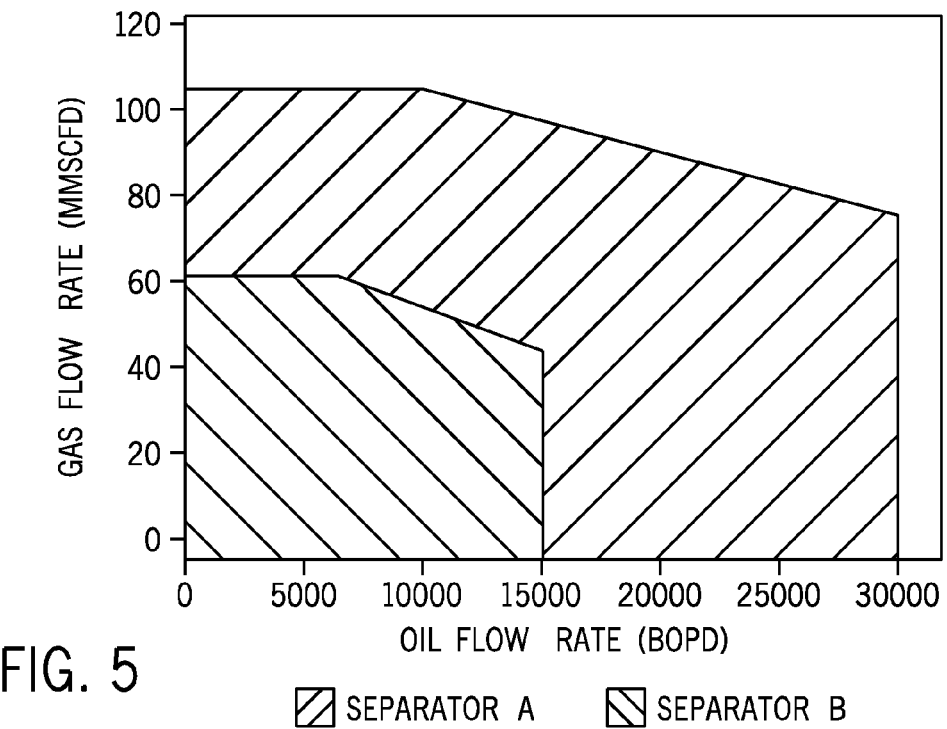
FIG. 5 is a graph representing examples of operating envelopes of two separators in accordance with one embodiment.

As noted above, in a quality assurance context the GVF (or LVF) could also be used as an indicator of the gas flow rate accuracy. Below a certain GVF value (e.g., the GVF threshold 82), the flow rate could be flagged as "out of range/not trustable," for example. It will be appreciated that the GVF may vary during a separation process. To facilitate quality control and quality assurance techniques using the measured GVF, the error made on the volumetric flow rate calculation at standard conditions can be estimated. The volumetric flow rate at standard conditions is given by:

$$Q_{STD} = \frac{q}{\rho_{Air\ STD} \cdot SG}$$

where q (kg/s) is the mass flow rate at line conditions (raw data from the Coriolis meter), $\rho_{Air\ STD}$ is the density of air at standard conditions, and SG is the specific gravity of the gas (which can be measured with a gas gravitometer). By way of example, the operating envelopes of oil and gas flow rates for two separators (denoted here as Separators A and B) are generally depicted in FIG. 5. The error made on the edge of the envelopes for Separators A and B can be quantified at HLL (high liquid level) and LLL (low liquid level). Data used in an experimental study of Separators A and B are provided in the following table:

TABLE 1

| Separator | Gas Rate (MMSCFD) | Liquid level | P (psia) | T (° C.) | SG (—) | Oil API (—) |
|---|---|---|---|---|---|---|
| A | 105 | LLL | 1315 | 60 | 0.72 | 50 |
| A | 75 | HLL | 1315 | 60 | 0.8 | 32 |
| B | 61 | LLL | 1315 | 60 | 0.72 | 50 |
| B | 43 | HLL | 1315 | 60 | 0.8 | 32 |

Further, two different types of wells are studied: gas well for LLL cases and oil well for HLL cases.

The experimental tests performed in wet gas for Coriolis meters of Separators A and B showed that there is a systematic error on the gas mass rate as a function of the liquid mass fraction (LMF), where the gas mass rate error and the liquid mass fraction are defined as:

$$\frac{dq_{gas}}{q_{gas}} = \frac{q_{gas\_true} - q_{Coriolis}}{q_{gas\_true}}$$

$$LMF = \frac{q_{liq\_true}}{q_{gas\_true} + q_{liq\_true}}$$

where $q_{gas\_true}$ is the true gas mass rate in the gas line (kg/s), $q_{liq\_true}$ is the true liquid mass rate in the gas line (kg/s), $q_{Coriolis}$ is the mass rate measured by the Coriolis meter (kg/s). This systematic error in wet gas can be taken into consideration in the calculation of the gas rate at standard conditions:

$$Q_{STD} = \frac{q}{\rho_{Air\ STD} \cdot SG}$$

Figure 6:
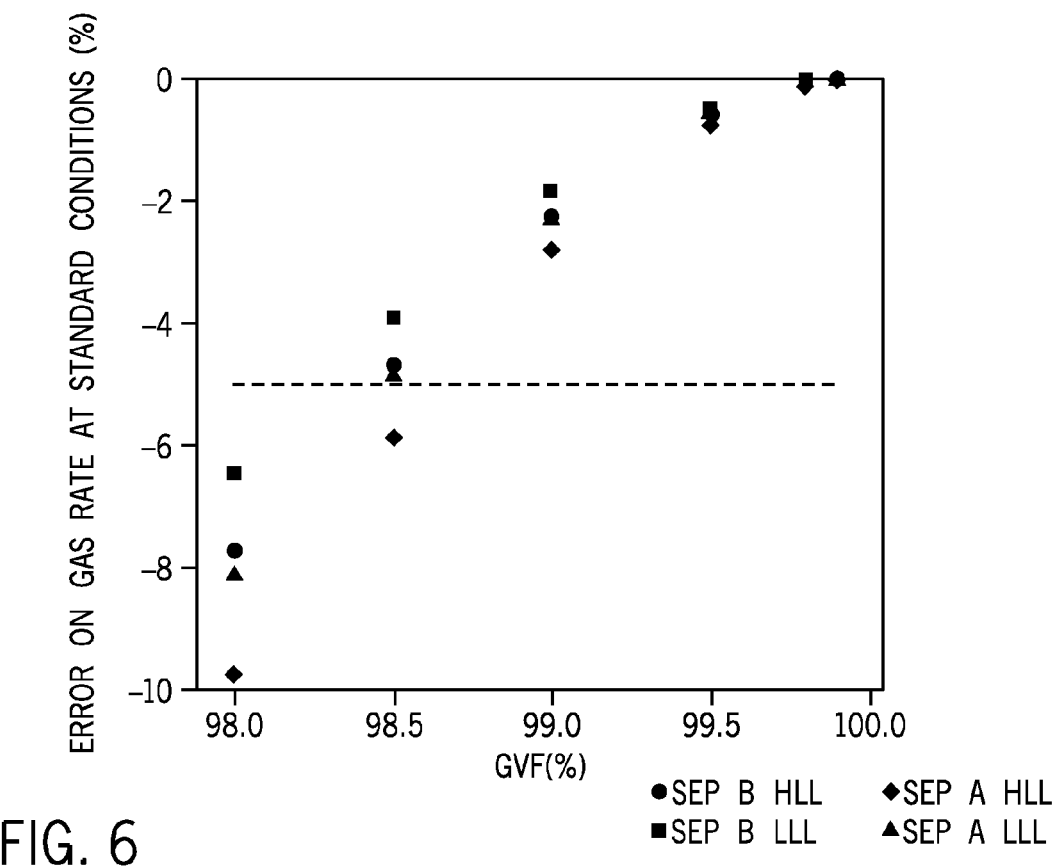
FIG. 6 is a graph depicting margins of error on gas rate calculations as a function of measured gas volume fraction for the two separators of FIG. 5 in accordance with one embodiment.

The results of the study are generally depicted in FIG. 6. As can be seen in this graph, and assuming no error in the specific gravity measurement, the error on the gas rate at standard conditions remains within the −10% error for gas volume fractions at or above 98% for each of Separators A and B in both high and low liquid level conditions. While operating parameters and study results for Separators A and B are presently described for explanatory purposes, it will be appreciated that other separators may have different operating parameters (e.g., oil and gas flow rate capabilities). It will also be appreciated that the error on gas rate measurements for other separators and meters can be determined in a manner similar to that described here for Separators A and B.

As generally noted above, the GVF can be used as an indicator of good or poor gas rate accuracy. In some embodiments, the margin of error in the gas rate measurement at standard conditions can be used in combination with the margin of error in the GVF measurement for verifying gas rate accuracy. For example, in the case of Separators A and B, if a client desires a gas flow rate that is accurate to within ±5% (a level indicated by the horizontal dashed line in FIG. 6), the flow rate should not be trusted if the actual GVF is below 98.5%. If the margin of error in the measured GVF is ±1%, the flow rate at standard conditions should not be trusted if the measured GVF is below 99.5% (as accuracy would be below the 5% acceptable margin of error requested for the gas flow rate). The same principle could be used for other requested accuracies, such as gas flow rate measurements accurate to within 2% or 10% as generally shown in the following table:

TABLE 2

| Desired accuracy of $Q_{std}$ (margin of error) | True GVF lower limit (%) (based on FIG. 6) | Min. measured GVF down to which Qstd is within desired accuracy (%) |
|---|---|---|
| 2% | 99 | 100 (99 × 1.01) |
| 5% | 98.5 | 99.5 (98.5 × 1.01) |
| 10% | 98 | 99 (98 × 1.01) |

In another embodiment, a method for assuring quality of a flow rate measurement includes routing a multiphase fluid into a separator, separating the multiphase fluid into a first fluid and a second fluid, and routing the first fluid from the separator into a gas outlet line. The method also includes determining a gas volume fraction of the first fluid within the gas outlet line, measuring a flow rate of the first fluid within the gas outlet line, and using the determined gas volume fraction to assess quality of the flow rate measurement of the first fluid within the gas outlet line. As discussed above, the accuracy of the flow rate measurement of the first fluid within the gas outlet line can vary according to the gas volume fraction. In at least some instances, using the determined gas volume fraction to assess quality of the flow rate measurement of the first fluid within the gas outlet line includes comparing the determined gas volume fraction to a threshold gas volume fraction to determine whether the accuracy of the flow rate measurement is above a desired accuracy level.

Determining the gas volume fraction of the first fluid within the gas outlet line can also include determining an inefficiency factor of a Coriolis meter coupled to the gas outlet line and through which the first fluid is routed, comparing the determined inefficiency factor to a baseline inefficiency factor, and determining the gas volume fraction of the first fluid based on the comparison. Further, determining the inefficiency factor of the Coriolis meter can includes calculating a ratio of a drive gain of the Coriolis meter to the square of a pickoff voltage amplitude of the Coriolis meter, as discussed above. Additionally, comparing the determined inefficiency factor to a baseline inefficiency factor can include comparing the determined inefficiency factor to a baseline inefficiency factor calculated for the Coriolis meter for dry gas flow.

An analysis system 38 of the apparatus 10 can be used to implement the functionality described above. For example, in at least some embodiments the analysis system 38 is operable to calculate, for fluid in the gas outlet line 18, the gas volume fraction, the mass flow rate, the density, and the volumetric flow rate, and to use the gas volume fraction to verify accuracy of the volumetric flow rate. The analysis system 38 could also use margins of error in the calculated volumetric flow rate and gas volume fraction to verify a desired accuracy (e.g., requested by a client) of the volumetric flow rate. Further, the analysis system 38 could be operated to automatically adjust a separator setting in response to detecting that a desired flow rate accuracy is not being met.

Figure 7:
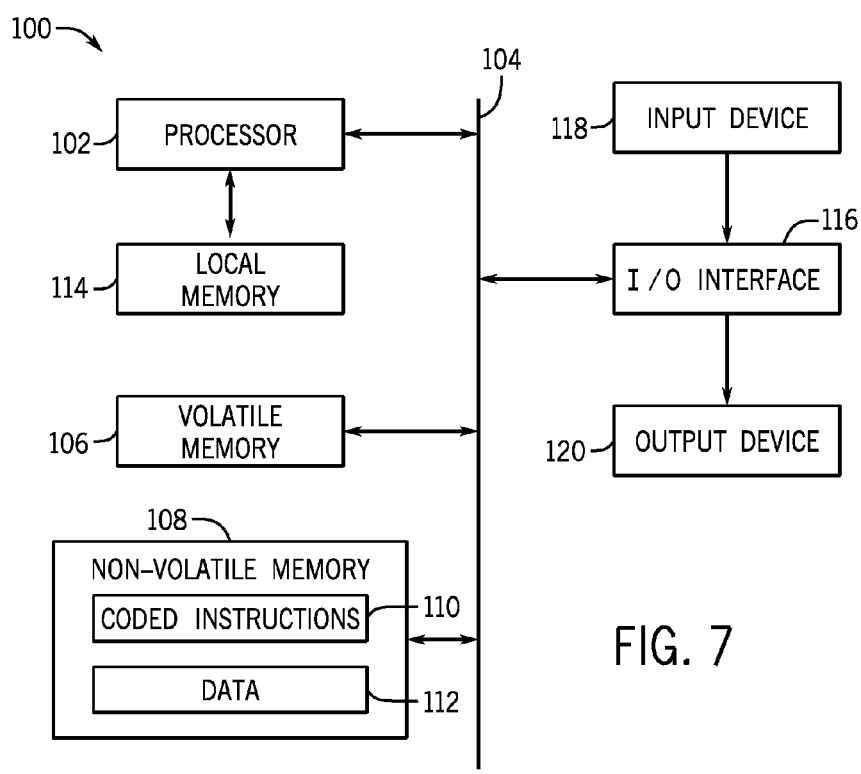
FIG. 7 is a block diagram of components of one example of an analysis system that can be used to determine flow rate and gas volume fraction of a separated fluid in accordance with one embodiment.

The analysis system 38 can be provided in any suitable form, such as a processor-based system. An example of such a processor-based system 100 is generally provided in FIG. 7. In this depicted embodiment, the system 100 includes at least one processor 102 connected by a bus 104 to volatile memory 106 (e.g., random-access memory) and non-volatile memory 108 (e.g., flash memory and a read-only memory (ROM)). Coded application instructions 110 and data 112 (e.g., the GVF threshold 82) are stored in the non-volatile memory 108. The instructions 110 and the data 112 may be also be loaded into the volatile memory 106 (or in a local memory 114 of the processor) as desired, such as to reduce latency and increase operating efficiency of the system 100. The coded application instructions 110 can be provided as software that may be executed by the processor 102 to enable various functionalities described above. In at least some embodiments, the application instructions 110 are encoded in a non-transitory, computer-readable storage medium, such as the volatile memory 106, the non-volatile memory 108, the local memory 114, or a portable storage device (e.g., a flash drive or a compact disc).

An interface 116 of the system 100 enables communication between the processor 102 and various input devices 118 and output devices 120. The interface 116 can include any suitable device that enables such communication, such as a modem or a serial port. In some embodiments, the input devices 118 include one or more sensing components of the apparatus 10 (e.g., sensors 34 and 36, and coils of the pickoffs 50 and 52 of Coriolis meters) and the output devices 120 include displays, printers, and storage devices that allow output of data received or generated by the system 100.

The foregoing outlines features of several embodiments so that those skilled in the art may better understand aspects of the present disclosure. Those skilled in the art should appreciate that they may readily use the present disclosure as a basis for designing or modifying other processes and structures for carrying out the same purposes or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The invention claimed is:

1. A method comprising:
   determining volumetric flow rate of a fluid in a gas outlet line of a gas-liquid separator, thereby providing a determined volumetric flow rate; and
   analyzing reliability of the determined volumetric flow rate of the fluid by:
      determining a gas volume fraction of the fluid in the gas outlet line of the gas-liquid separator;
      comparing the gas volume fraction to a threshold gas volume fraction, the threshold gas volume fraction determined by experiment; and
      determining whether the determined volumetric flow rate of the fluid is reliable based on the comparison.

2. The method of claim 1, wherein determining whether the determined volumetric flow rate of the fluid is reliable includes determining that the determined volumetric flow rate of the fluid is reliable if the gas volume fraction of the fluid is above the threshold gas volume fraction and determining that the determined volumetric flow rate of the fluid is not reliable if the gas volume fraction of the fluid is below the threshold gas volume fraction.

3. The method of claim 1, comprising triggering an alarm if the gas volume fraction of the fluid is below the threshold gas volume fraction.

4. The method of claim 1, comprising adjusting a setting of the gas-liquid separator in response to detecting that the gas volume fraction of the fluid is less than the threshold gas volume fraction.

5. The method of claim 1, wherein determining the volumetric flow rate of the fluid in the gas outlet line includes using the gas volume fraction of the fluid in calculating the determined volumetric flow rate of the fluid.

6. The method of claim 5, comprising selecting the threshold gas volume fraction level.

7. The method of claim 6, wherein the threshold gas volume fraction is selected based on at least one of a desired accuracy of the determined volumetric flow rate, a first margin of error in the determination of the gas volume fraction, and a second margin of error in the determination of the determined volumetric flow rate.

8. The method of claim 1, wherein determining the gas volume fraction includes measuring the gas volume fraction of the fluid with a Coriolis meter.

9. The method of claim 1, wherein determining the gas volume fraction includes using a carry-over meter at the gas-liquid separator to measure the gas volume fraction of the fluid.

10. The method of claim 1, wherein determining the gas volume fraction includes:
measuring mass flow rate of the fluid with a Coriolis meter;
calculating an inefficiency factor of the Coriolis meter; and
using the calculated inefficiency factor to estimate the gas volume fraction.

11. An apparatus comprising:
a separator including a gas-liquid separation vessel;
a gas outlet line coupled to receive a gas-containing fluid from the gas-liquid separation vessel;
a Coriolis meter coupled to the gas outlet line to enable measurement of mass flow rate of the gas-containing fluid; and
an analysis system operable to determine a volumetric flow rate of the gas-containing fluid in the gas outlet line by using the mass flow rate, thereby providing a determined volumetric flow rate, and to determine a component volume fraction of the gas-containing fluid in the gas outlet line, the analysis system to use the component volume fraction and a threshold component volume fraction to determine an accuracy of the determined volumetric flow rate, the threshold component volume fraction determined experimentally.

12. The apparatus of claim 11, wherein the analysis system is operable to use a selected threshold component volume fraction to determine an accuracy of the determined volumetric flow rate, the selected threshold component volume fraction based on at least one of a desired accuracy of the volumetric flow rate, a margin of error in the determination of the volumetric flow rate, and a margin of error in the determination of the component volume fraction.

13. The apparatus of claim 11, wherein the analysis system is operable to adjust a setting of the separator in response to detecting that a desired accuracy of the volumetric flow rate is not being met.

14. The apparatus of claim 11, wherein the gas-liquid separation vessel is positioned at a wellsite and is coupled to receive produced fluid from wellhead equipment.

15. The apparatus of claim 14, wherein the analysis system is positioned at the wellsite.

16. A method comprising:
routing a multiphase fluid into a separator;
separating the multiphase fluid into a first fluid and a second fluid;
routing the first fluid from the separator into a gas outlet line;
determining a gas volume fraction of the first fluid within the gas outlet line;
measuring a flow rate of the first fluid within the gas outlet line; and
using the determined gas volume fraction and a threshold gas volume fraction to assess reliability of the flow rate measurement of the first fluid within the gas outlet line, wherein the threshold gas volume fraction is determined experimentally.

17. The method of claim 16, wherein the reliability of the flow rate measurement of the first fluid within the gas outlet line varies according to the gas volume fraction, and using the determined gas volume fraction and the threshold gas volume fraction to assess reliability of the flow rate measurement of the first fluid within the gas outlet line includes comparing the determined gas volume fraction to the threshold gas volume fraction to determine whether the reliability of the flow rate measurement is above a desired accuracy.

18. The method of claim 16, wherein determining the gas volume fraction of the first fluid within the gas outlet line includes:
determining an inefficiency factor of a Coriolis meter coupled to the gas outlet line and through which the first fluid is routed;
comparing the determined inefficiency factor to a baseline inefficiency factor; and
determining the gas volume fraction of the first fluid based on the comparison of the determined inefficiency factor to the baseline inefficiency factor.

19. The method of claim 18, wherein determining the inefficiency factor of the Coriolis meter includes calculating a ratio of a drive gain of the Coriolis meter to the square of a pickoff voltage amplitude of the Coriolis meter.

20. The method of claim 18, wherein comparing the determined inefficiency factor to a baseline inefficiency factor includes comparing the determined inefficiency factor to a baseline inefficiency factor calculated for the Coriolis meter for dry gas flow.

* * * * *